US009110364B1

(12) United States Patent
Coley et al.

(10) Patent No.: US 9,110,364 B1
(45) Date of Patent: Aug. 18, 2015

(54) PASSIVE PROJECTION SCREEN FOR PRESENTING PROJECTED IMAGES IN 3D

(71) Applicant: Rawles LLC, Wilminton, DE (US)

(72) Inventors: Christopher David Coley, Morgan Hill, CA (US); Eric Gifford Marason, San Francisco, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 14/658,591

(22) Filed: Mar. 16, 2015

Related U.S. Application Data

(63) Continuation of application No. 13/528,742, filed on Jun. 20, 2012, now Pat. No. 8,982,459.

(51) Int. Cl.
| G03B 21/56 | (2006.01) |
| G03B 21/604 | (2014.01) |
| G02B 27/22 | (2006.01) |
| G03B 21/606 | (2014.01) |
| G02B 27/26 | (2006.01) |

(52) U.S. Cl.
CPC ............ G03B 21/56 (2013.01); G02B 27/2228 (2013.01); G03B 21/604 (2013.01); G03B 21/606 (2013.01); *G02B 27/26* (2013.01)

(58) Field of Classification Search
CPC .............................. G03B 21/604; G03B 21/606
USPC ............................ 359/458, 465, 472; 353/7, 8
See application file for complete search history.

(56) References Cited

U.S. PATENT DOCUMENTS

| 2,631,496 | A | 3/1953 | Rehorn |
| 2,681,496 | A | 6/1954 | Heckrott |
| 4,140,370 | A | 2/1979 | Snaper et al. |
| 5,483,254 | A | 1/1996 | Powell |
| 5,930,037 | A | 7/1999 | Imai |
| 5,945,965 | A | 8/1999 | Inoguchi et al. |
| 8,474,980 | B2 | 7/2013 | Hsu et al. |
| 8,570,651 | B1 | 10/2013 | Choi |
| 8,982,459 | B1 * | 3/2015 | Coley et al. .................. 359/458 |
| 2005/0286126 | A1 | 12/2005 | Huang et al. |
| 2010/0033680 | A1 | 2/2010 | Krijn et al. |
| 2010/0091205 | A1 | 4/2010 | Wu et al. |
| 2012/0182406 | A1 | 7/2012 | Woo |

FOREIGN PATENT DOCUMENTS

WO  WO2011088053  7/2011

OTHER PUBLICATIONS

"Diffuser", Wikipedia encycolpedia, retrieved on Aug. 4, 2014, from http://en.wikipdia.org/wiki/Diffuser, last modified on Mar. 28, 2014, 2 pages.

(Continued)

*Primary Examiner* — Christopher Mahoney
(74) *Attorney, Agent, or Firm* — Lee & Hayes, PLLC

(57) ABSTRACT

A directive projection screen is configured to present images projected from a remote projector in three dimensions (3D) to a viewer. The screen includes a plurality of passive optical elements arranged on a structural substrate. The optical elements are configured to receive incident light projected from the projector and reflect the light such that first portions of the image are directed in a first direction to be viewed by a first eye of the viewer and second portions of the image are directed in a second direction to be viewed by a second eye of the viewer.

20 Claims, 13 Drawing Sheets

(56) References Cited

OTHER PUBLICATIONS

Office Action for U.S. Appl. No. 13/528,742, mailed on Feb. 5, 2014, Christopher D. Coley, "Passive Projection Screen for Presenting Projected Images in 3D", 7 pages.

Office action for U.S. Appl. No. 13/528,742, mailed on Aug. 8, 2014, Coley et al., "Passive Projection Screen for Presenting Projected Images in 3D", 7 pages.

Pinhanez, "The Everywhere Displays Projector: A Device to Create Ubiquitous Graphical Interfaces", IBM Thomas Watson Research Center, Ubicomp 2001, 18 pages.

\* cited by examiner

PASSIVE PROJECTION SCREEN FOR PRESENTING PROJECTED IMAGES IN 3D

This Application claims priority to U.S. patent application Ser. No. 13/528,742, filed Jun. 20, 2012, and entitled "Passive Projection Screen for Presenting Projected Images in 3D", which is incorporated herein by reference.

BACKGROUND

Passive display screens are used to present images that are projected by a projector. Home entertainment systems often use projection systems to project images onto a passive screen to provide a big screen, high quality viewing experience. Unfortunately, passive display screens suffer significant loss of image contrast due to light from non-projector sources, such as room lights, daylight from windows, and so forth. As a result, quality of the image presented on existing passive display screens is poor. Further, traditional passive display screens typically reflect the projected image as a two-dimensional (2D) image. For users to experience three-dimensional (3D) images, such as at a theater, users are often required to wear special 3D glasses to convert the 2D image into a 3D experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
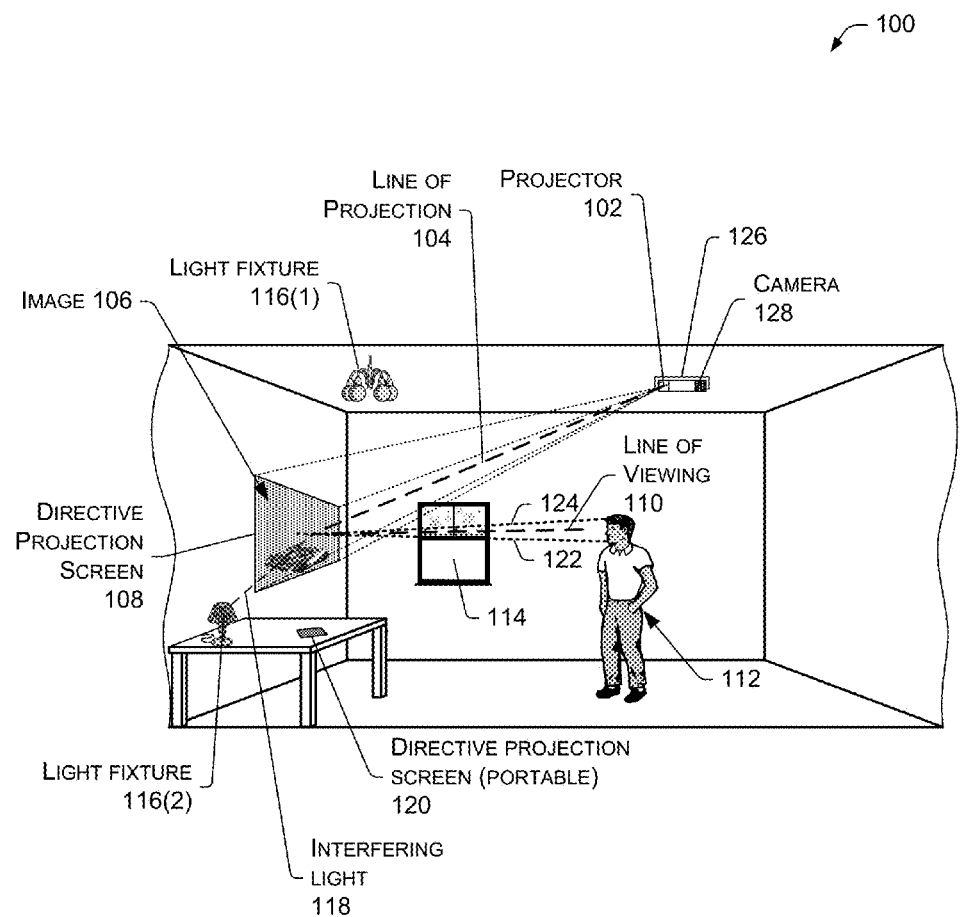
FIG. 1 shows an illustrative scene containing a projector, several non-projector light sources, and a passive projection screen that may be configured to present images in either 2D or 3D.

Projection systems are used in a variety of environments including movie theaters, conference rooms, classrooms, homes, and so forth. These projection systems include a projector configured to emit light towards a projection surface or screen. The projection surface in turn is configured to accept and scatter the light such that an image is presented to viewers. The projection surface may be fixed, such as one that mounts to a wall or a stand, or portable, such as a handheld projection screen.

Existing projection surfaces suffer degradation of the presented image resulting from non-projector light sources such as windows letting daylight in, room lights, and so forth. This degradation takes the form of loss of image contrast, which may be visualized as a "washing out" of the image. Further, traditional projection surfaces simply reflect projected images in a flat two-dimensional (2D) image.

Disclosed herein are directive projection screens that provide higher quality images as compared to existing passive projection screens. These directive projection screens are configured such that light from a projector within a predetermined acceptance cone of the projection screen is scattered and reflected for presentation, while light outside of the acceptance cone is not reflected to the viewer. The screens described herein provide improved gain of the projected image. As a result, the directive projection screens described herein result in improved contrast and image presentation to viewers.

Further, the directive projection screen can be configured with features that enable the image to appear to the user in three-dimensions (3D) without aid of special 3D glasses. By orienting the features in a predetermined pattern, the passive screen reflects a portion of the projected image in a direction suitable for left eye viewing and another portion of the projected image in another direction suitable for right eye viewing. The two directions define a parallax that yields a 3D experience for the viewer.

To enable a 3D appearance with this passive screen, the projector projects an image with pixel sizes smaller than the feature size. The projection system tracks the image on the screen to determine which pixels of the projected image appear in left features and thus would be visible by the left eye and which pixels appear in the right features and thus would be visible by the right eye. This map of left and right eye pixels is used to display the left and right image components for the viewer to see a 3D image. In other implementations, polarization elements may be used to eliminate or reduce the need for the projection system to track the image.

The projection system with a passive directive screen may be implemented in many ways. One illustrative implementation is described below in which the projection system is implemented as part of an augmented relative environment within a room. However, the system may be implemented in many other contexts and situations in which images are projected onto screens for view consumption.

Illustrative Environment

FIG. 1 shows an illustrative environment 100 in which a projection system with a passive directive projection screen may be used. The environment 100 includes a projector 102 provided within a room, such as a room of a home, a conference room, and the like. In this illustration, the projector 102 is implemented as part of an augmented reality functional node, which includes one or more projectors and one or more cameras to capture projected images or patterns. The projector 102 is shown mounted to the ceiling of the room, although it may be placed in other locations. The projector 102 may be implemented with any number of technologies capable of generating an image and projecting that image onto a surface. Suitable technologies include a digital micromirror device (DMD), liquid crystal on silicon display (LCOS), liquid crystal display, 3LCD, laser projector, and so forth. In some implementations, a plurality of projectors 102 may be used.

The projector 102 has a projector field of view which describes a particular solid angle. Along the center of this solid angle may be visualized a line of projection 104 which extends to a center of an image 106. The image 106 is presented on a directive projection screen 108, which is shown mounted on a wall of the room. The directive projection screen 108 may be located in other places, and it may be implemented as a portable screen that can be set up at essentially any location within the room.

A line of viewing 110 extends from the image 106 to a viewer 112, who is shown standing in the room. The line of viewing 110 is shown as substantially horizontal as the viewer 112 is standing up. In other arrangements, the line of viewing 110 may be angled relative to the floor as the viewer 112 may be sitting in a recliner, or the screen 108 may be positioned lower on the wall below the viewer's eye level.

The room may include several non-projector light sources, such as a window 114, an overhead light fixture 116(1), a table lamp light fixture 116(2), and so forth. These non-projector light sources may produce interfering light 118 that impinges upon at least a portion of the directive projection screen 108. This interfering light 118 may degrade the image 106 to the point that the presentation to the viewer 112 is unacceptable.

There may be more than one directive projection screen in the room. In addition to the wall mounted screen 108, other wall mounted screens may be positioned about the room, or surfaces (such as a table surface) may be employed to reflect a projected image. In some implementations, a portable directive projection screen 120 may also or alternatively be used. The portable directive projection screen 120 is shown resting on the table, but may be carried by the viewer 112 or otherwise moved easily around the room. The problem of image degradation due to external lights is worse for the portable directive projection screen 120, given that variations in angle and position of the screen relative to interfering light sources may change during use.

The projector 102 may be configured to track the portable screen 120 during movement within the room and project an image onto it for presentation. For example, text for an electronic book may be projected onto the portable directive projection screen 120 for reading by the viewer 112. Tracking may be accomplished by recognizing the shape of the screen 120, following optical targets disposed on the screen, and so forth.

The various directive projection screens 108 and 120 are designed to reflect incoming light in a directed manner. The screens 108 and 120 include features that can be oriented and arranged to reflect a projected image in one direction while reflecting interfering light in another, or to project the image in two directions to produce a 3D effect, or both.

In one implementation, the directive projection screens may comprise a structural substrate such as a foam core, plastic sheet, and so forth. The longest linear dimension of the substrate, when in use, is approximately 60 centimeters or less. The weight of the portable directive projection screen 120 may be less than three kilograms in some implementations. The structural substrate may be configured to be rigid, foldable, rollable, and so forth. Atop the structure substrate is a sheet of material that is embossed with features that directionally reflect the projected images. The features are oriented in an alternating pattern, allowing the passive screen to reflect a projected image to present a left eye image to the left eye and a right eye image to the right eye. That is, the projected image is directed from this embossed layer of the screen in two directions: a left side direction 122 oriented to one side of the line of viewing 110 for the viewer's left eye to see, and a right side direction 124 oriented to the other side of the line of viewing 110 for the viewer's right eye to see. This yields a 3D experience for the viewer.

As noted above, the projector 102 is implemented as part of an augmented reality functional node 126, which includes one or more cameras 128 to capture images of the room. In some situations, two camera(s) 128 may be used to track the projected image from the screen 108 or portable screen 120 to determine which pixels of the projected image appear in the left image features and which pixels of the projected image appear in the right image features. The left image features reflected along direction 122 would be visible by the viewer's left eye and the right image features reflected along direction 124 would be visible by the viewer's right eye. The node 126 maintains a map of left and right eye pixels to display the left and right image components for the viewer to see a 3D image.

The node 126 may also be used to create an augmented reality environment. In this situation, the projector 102 may be used to project structured light patterns onto the surroundings of the room and the camera 128 captures the images. The structured light patterns may use invisible light so that the human viewer 112 does not detect the patterns.

Example Implementations of Directive Projection Screen

Figure 2:
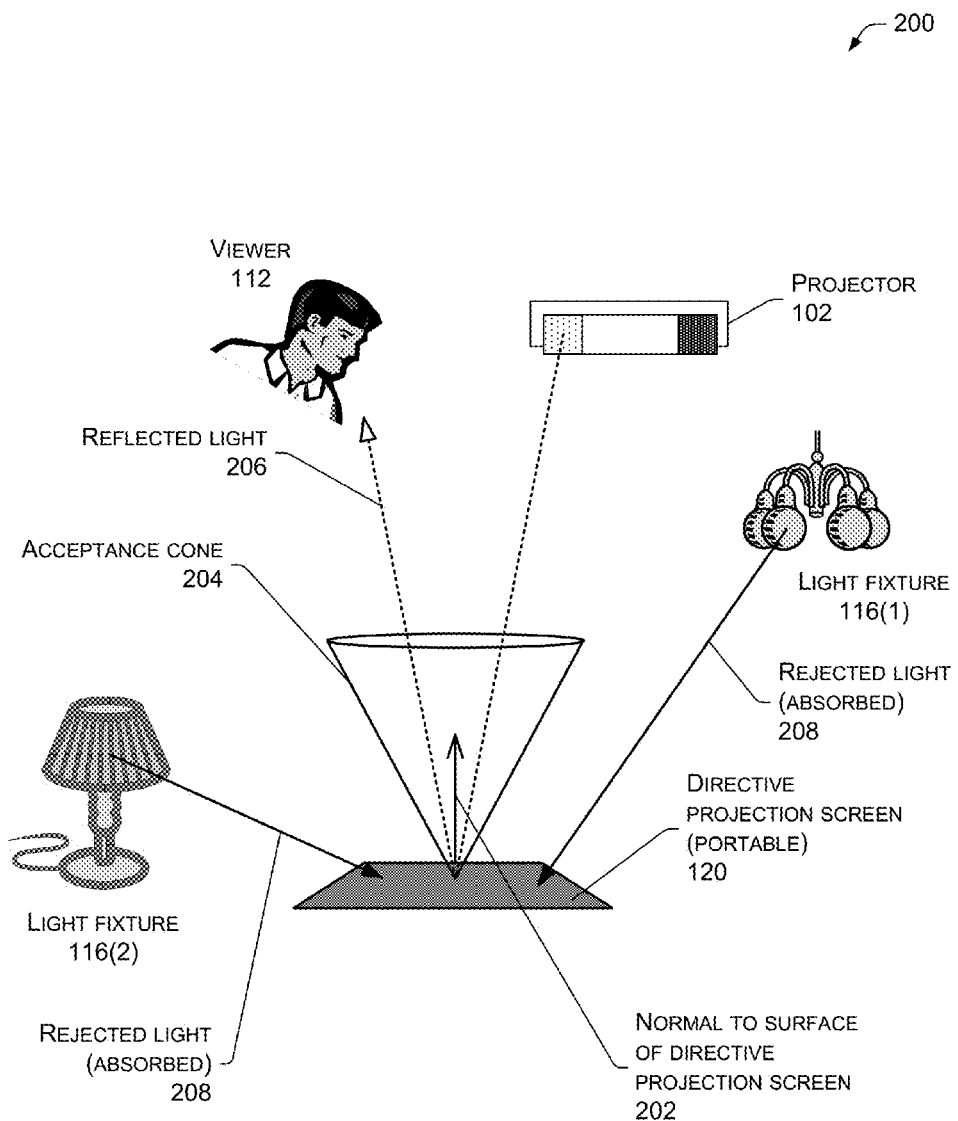
FIG. 2 illustrates an acceptance cone and a viewing cone as well as the reflection and rejection of light impinging on the directive projection screen from different angles.

FIG. 2 illustrates a first configuration 200 of the directive projection screen in which the screen returns images to the viewer 112 while rejecting the interfering light. In this illustration, the portable directive projection screen 120 is shown, although mounted screen 108 may be similarly configured.

A normal 202 is shown perpendicular or orthogonal to a plane of the directive projection screen 120. An acceptance cone 204 is shown which describes an angle relative to the normal 202. The acceptance cone 204 is the angular range within which incident light 206 will be accepted and reflected generally back towards the viewer 112. For example, as shown here, the light 206 from the projector 102 is within the acceptance cone 204 and is thus reflected back to the viewer 112. In some implementations, the acceptance cone 204 may extend 30 degrees from the normal 202. Incident light which is outside the acceptance cone 204 is rejected. For example, incident light 208 from the light fixtures 116(1) and 116(2) impacts the screen 120 outside of the acceptance cone 204 (i.e., greater than 30 degrees from the normal 202). The screen 120 is configured to reject this otherwise interfering light. This rejection may comprise redirection of the light away from the viewer 112, absorption of the light, and so forth.

A viewing cone may describe an angular range in which the viewer 112 is able to view the image 106. In the example above, the acceptance cone 204 and the viewing cone may be coincident.

Figure 3:
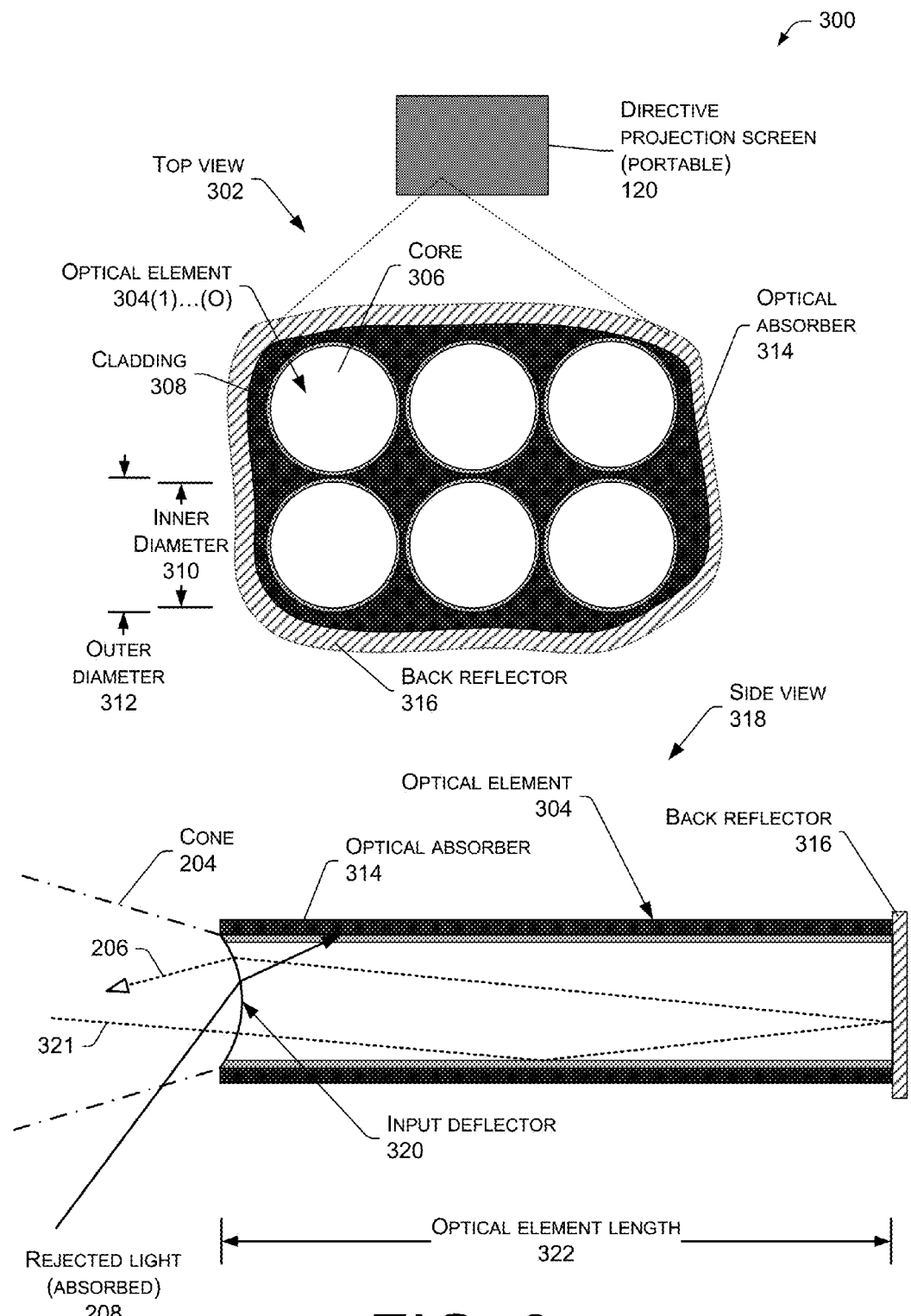
FIG. 3 illustrates an enlarged portion of a directive projection screen comprising optical waveguides.

FIG. 3 illustrates an enlarged portion 300 of the directive projection screen 120 (or 108). A top view 302 is taken looking down on the screen 120, and magnified to show a plurality of optical elements 304(1), 304(2), . . . , 304(O). The optical elements 304(1)-(O) may be arranged in a number of ways. In this illustration, the elements are arranged in a matrix of linear rows and columns. The optical elements 304 comprise optical waveguides that conduct light. The optical elements 304 may include, but are not limited to, optical fibers as shown here.

Each optical fiber of an element 304 comprises a core 306 surrounded by a thin cladding 308. The core 306 may be formed of a light conducting material, such as glass, plastic, crystalline material, and so forth. When the optical elements 304 comprise optical fibers, the refractive index of the core 306 may be about 1.589 while the refractive index of the cladding 308 is about 1.517.

The optical elements 304(1)-(O) may be sized such that their width or diameter is equal to or less than a minimum width of a projected pixel. In the example shown here, an inner diameter 310 of the core 306 may be about 94 microns, while an outer diameter 312 of the surrounding cladding 308 may be about 100 microns. Accordingly, individual optical elements 304(1)-(O) are about 100 microns, although they may be smaller.

The optical elements 304 may be held in place or distributed within a matrix configured as an optical absorber 314. The optical absorber 314 is configured to be highly absorptive of visible light frequencies. For example, the optical absorber 314 may comprise black glass, carbon black, or a dark pigment. The matrix may aid in maintaining the optical elements in a generally parallel arrangement with one another.

Behind the optical elements 304 is a back reflector 316. This back reflector 316 is optically coupled to the optical elements 304, and is configured to be highly reflective to visible light frequencies. For example, in some implementations the back reflector 316 may comprise a sputtered aluminum mirror. The reflector may be configured to act as a notch filter, reflecting light of particular frequencies. In some implementations, different back reflectors 316 may be configured to act as different optical notch filters for different optical elements 304. These optical notch filters may include a fiber Bragg grating configured to reflect a particular wavelength of light, a plurality of optical interference films having different refractive indices, and so forth.

Each optical element 304 is elongated, projecting outward from the back reflector 316. FIG. 3 illustrates a side view 318 of one optical element 304. Light enters the optical element 304 via an input deflector 320 disposed at the entrance or front of the optical element 304. The input deflector 320 is configured to alter a direction of incident light, and prevents an input angle from matching an exit angle. Such alteration expands the viewing cone and improves the angular range relative to the normal 202 within which the viewer 112 may see the image 106. As shown here, the input deflector 320 may comprise a concave feature present in the optical element 304. For example, an optical fiber may be ground or etched to produce the described concavity. The radius of curvature of the concavity of the input deflector 320 may vary. In the implementation shown, the radius of curvature is about 167 microns. In some implementations, the input deflector 320 may comprise a plano-concave lens optically coupled to the front of the optical element 304. In another implementation, a plurality of optically refractive elements may be used, such as glass or plastic beads.

As shown here, incoming light 321 incident on the optical element 304 within the acceptance cone 204 enters the input deflector 320 and undergoes a change in direction. The light continues down the optical element 304 by internal reflection, reaches the back reflector 316, and is reflected the back down the optical element 304 for eventual exit as reflected light 206. In contrast, incoming light 208 incident on the optical element 304 at an angle outside of the acceptance cone 204 enters the input deflector 320, but fails to transfer down the optical element 304 via internal reflection. Instead, the light is readily absorbed by the optical absorber 314 and hence rejected in that it is not reflected out from the optical element 304.

The optical element 304 has a length 322 from front to the back reflector 316. In one implementation, the length 322 may be a multiple of about five to ten times the outer diameter 312. In another implementation, the length 322 may be at least ten times the outer diameter 312. The optical element length 322 may vary between optical elements 304 within the screen.

Figure 4:
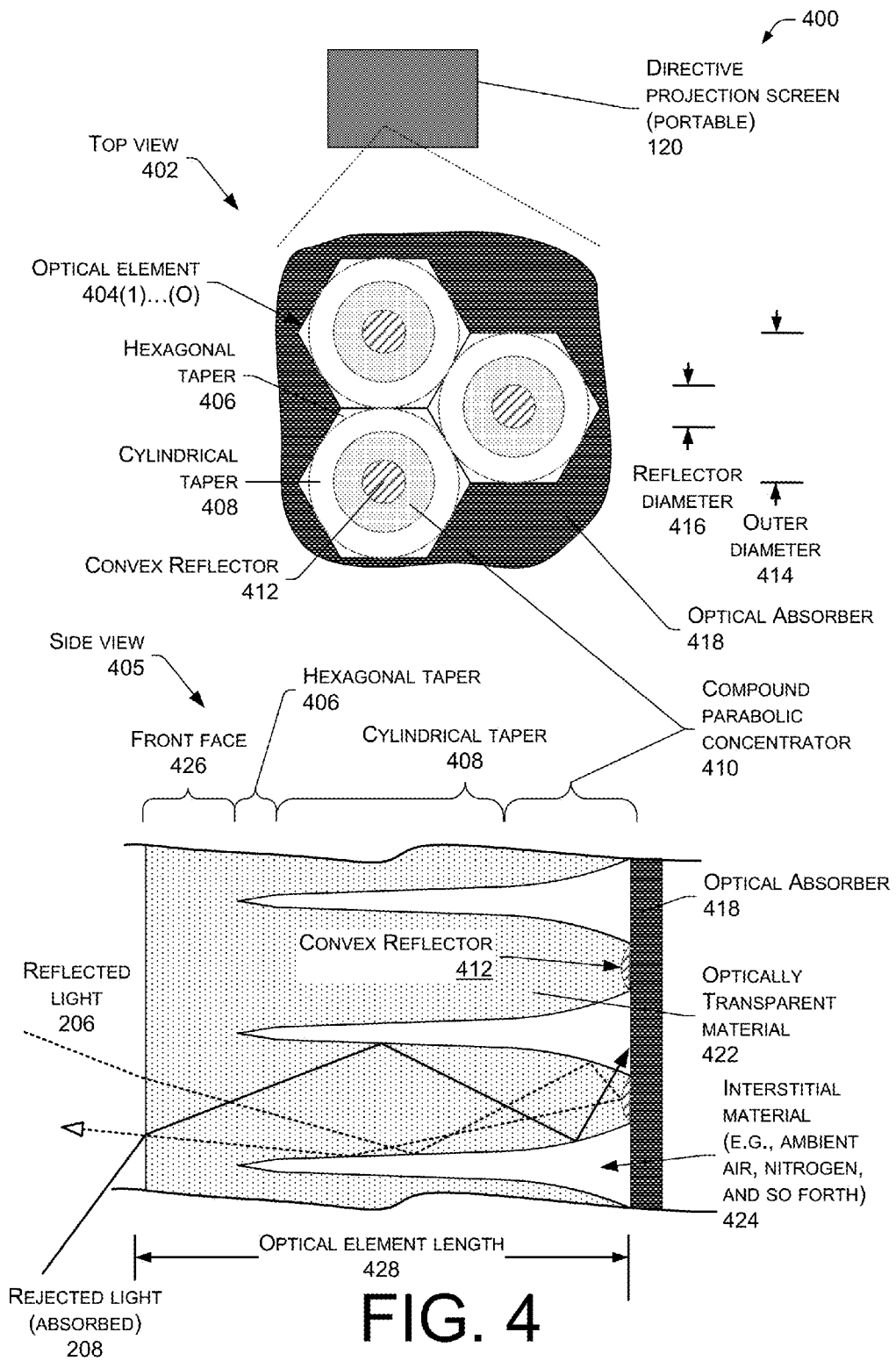
FIG. 4 illustrates an enlarged portion of a directive projection screen comprising an array of tapered optical guides.

FIG. 4 illustrates an enlarged portion 400 of the directive projection screen 120 (or 108), which comprises an array of tapered optical guides. A top view 402 taken from the screen 120 and magnified shows a plurality of optical elements 404(1), 404(2), . . . , 404(O). The optical elements 404(1)-(O) are arranged linearly in columns, with a half width offset so that the hexagonal perimeters nest with one another as shown. In addition to the top view 402 of the optical elements, a side view 405 is also illustrated.

Each of the optical elements 404(1)-(O) have a varying contour that includes an upper hexagonal taper 406, a middle cylindrical taper 408, and lower a compound parabolic concentrator 410. At the base of each optical element is a convex reflector 412. While an initial taper of a hexagon is shown, in other implementations one or more other shapes may be used. An outer diameter 414 of the optical element is tailored to an expected size of the projected pixels comprising the image 106. For example, the width or outer diameter 414 may be about 100 microns. A reflector diameter 416 may vary according to the arrangement of the compound parabolic concentrator 410. In one implementation, the reflector diameter 416 may be about 36 microns in diameter and have a radius of curvature of about 170 microns. As above, the convex reflector 412 may comprise sputtered aluminum. The reflector may be configured to act as a notch filter which reflects light of particular frequencies. In some implementations, the different reflectors may be configured with different optical notch filters.

Disposed behind the optical elements 404 is an optical absorber 418. The optical absorber 418 is configured to be highly absorptive of visible light frequencies. For example, the optical absorber 418 may comprise carbon black, or a dark pigment.

As shown in the side view 405, the optical elements 404 are disposed generally in parallel with one another, and perpendicular to a plane of the screen 120 in which they reside. The optical elements 404 comprise an optically transparent material 422. For example, in some implementations, a clear flexible silicone elastomer may be used. In other implementations acrylic, other polymers or glass may be used. Between portions of the optical elements 404 is an interstitial space, which may be filled with an interstitial material 424 such as an aerogel, gas, plastic, and so forth. A substantially planar front face 426 is shown at the front of the optical elements 404. The optical elements 404 may be individual elements and discrete from one another, or form sections or groups, such as shown here where the same optically transparent material 422 forms at least four of the optical elements 404 and the front face 426.

The side view 405 shows the transition from the front face 426 having the hexagonal taper 406 with a hexagonal cross section, then to the cylindrical taper 408 having a cylindrical cross section and finally to the compound parabolic concentrator 410 having a cylindrical cross section. Stated another way, from the front face 426, the optical element 404 transitions from a hexagonal prism in the hexagonal taper 406 to a cylinder in the cylindrical taper 408 to the compound parabolic concentrator 410. Within a focal point at a base of the compound parabolic concentrator 410 is the convex reflector 412. The convex reflector 412 is disposed such that the convexity extends towards the front face 426.

As shown here, reflected light 206 is light which is incident within the acceptance cone, enters the front face 426 and proceeds through the optically transparent material 422 via internal reflection. The light is concentrated via the compound parabolic concentrator 410 onto the convex reflector 412, where the light is reflected back out through the optical element 404. The reflected light 206 leaves the optical element 404 at a different angle compared to an entry angle. As mentioned above, this improves viewability by expanding the viewing cone within which the viewer 112 is able to see the image 106.

In contrast, rejected light 208 enters at an incident angle outside the acceptance cone and eventually exits the optically transparent material 422 through the interstitial material 424, where it is absorbed by the optical absorber 418. As a result, light outside of the acceptance cone is effectively rejected, improving the presentation of light from the projector 102 which is within the acceptance cone.

In another implementation, the front face 426 may comprise a separate sheet coupled to the optical elements 404 at or near the front edge of the hexagonal taper 406. Each optical element 404 has an optical element length 428 that extends from an outermost edge of the front face 426 to the optical absorber 418 may be between 200 and 500 microns. Omitting the front face 426, a linear distance from the front of the hexagonal taper 406 to the optical absorber 418 may be about 300 microns.

In some implementations, when the optically transparent material 422 is deformable, the convex reflector 412 may be a surface feature of the optical absorber 418. Upon assembly, the convex reflector 412 may compress at least a portion of a tip of the optically transparent material 422. For example, in one implementation the optical absorber 418 may comprise black acrylic having convex reflector surface features. When assembled with the optical elements 404 comprising flexible silicone, the convex reflector surface features compress the flexible silicone of the optical elements 404. This results in the placement of the convex reflector 412 within the compound parabolic concentrator 410 of the optically transparent material 422.

Figure 5:
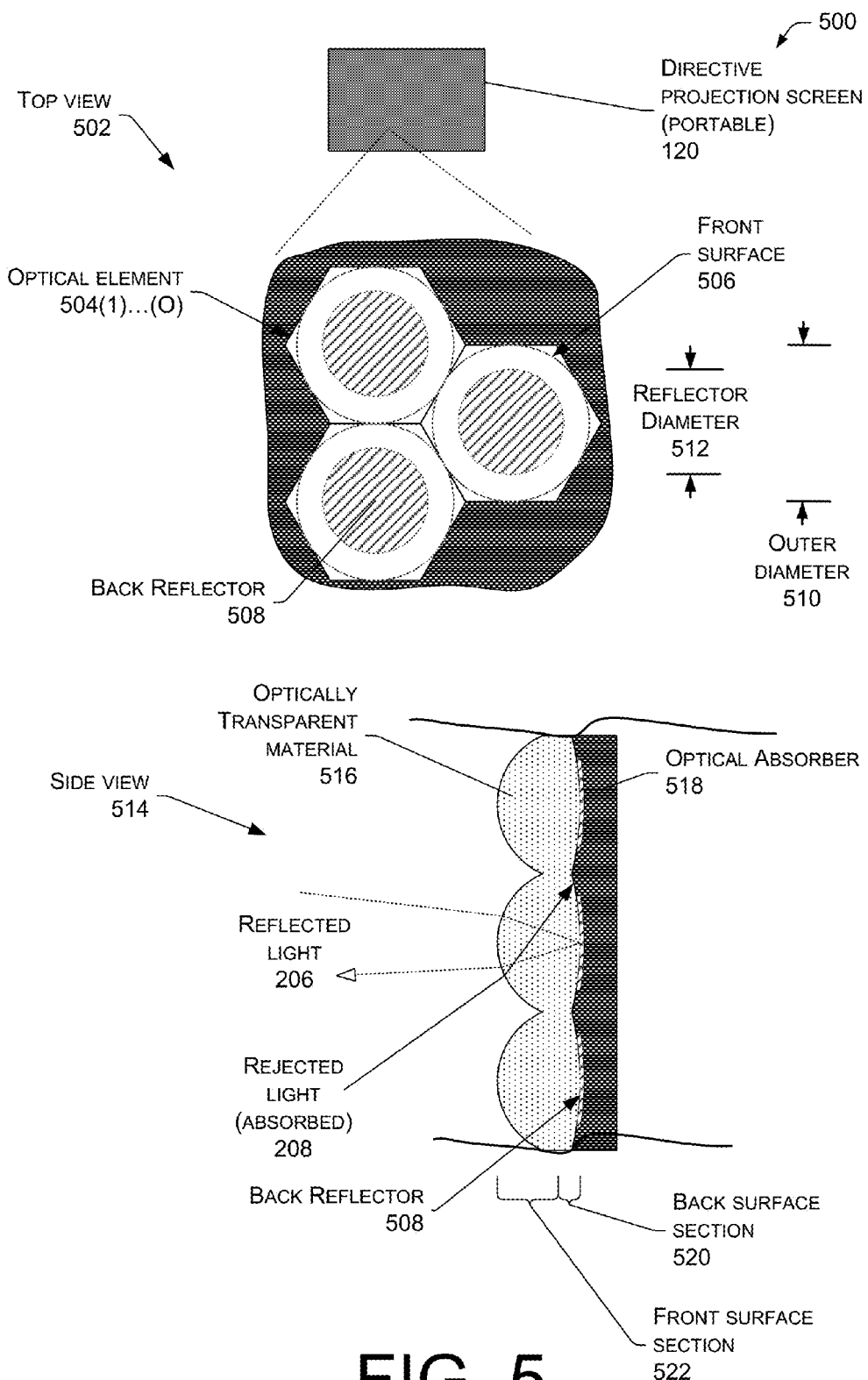
FIG. 5 illustrates an enlarged portion of a directive projection screen comprising an array of convex lenses having front surfaces and back surfaces with back reflectors.

FIG. 5 illustrates an enlarged portion 500 of a directive projection screen 120 (or 108), which includes an array of convex lenses having front surfaces and back surfaces with back mirrors. A top view 502 taken from the screen 120 and magnified shows a plurality of optical elements 504(1), 504(2), ..., 504(O) forming part of the projection screen. Each optical element 504 has a front surface or lens 506, a back surface or lens having about the same diameter, and a back reflector 508 disposed on or proximate to the back lens. These lenses may be spherical, aspherical, or a combination thereof. As described above, the optical element 504 may be sized such that its width or diameter is equal to or less than a minimum width of an estimated size of pixels from the projector 102. In one implementation, the optical element 504 has an outer diameter 510 of the front and back surfaces that is about 100 microns. A reflector diameter 512 is also shown, which is less than the outer diameter 510 of the lenses.

A side view 514 depicts the composition of the optical elements 504. The optical element 504 is formed of an optically transparent material 516, such as a clear silicone material. This may be a single piece of material, or a plurality of pieces bonded together. An optical absorber 518 is positioned behind the optical elements 504, and is configured to substantially absorb incident visible light.

The optical element 504 may be visualized as a convex back lens section 520 and a convex front lens section 522. The back lens section 522 comprises back surfaces which have a radius of curvature which is greater than a radius of curvature of the front surfaces. For example, the radius of curvature of the front lens may be about 55 microns while a radius of curvature of the back lens may be about 222 microns. These lenses may be spherical or aspherical.

At least a portion of each of the back surfaces is configured with the back reflector 508. For example, as shown here, the back reflector 508 is radially symmetrical about an optical axis and is configured with a diameter of about two-thirds the diameter of the back lens. In other implementations, the back reflector 508 may be displaced along the back of the back lens, asymmetrical, or both. Continuing the example above where the outer diameter 510 is about 100 microns, the back reflector 508 may be about 70 microns in diameter.

The optical absorber 518 is positioned behind the back lens section 520. As above, the optical absorber 518 is configured to be highly absorptive of visible light frequencies. For example, the optical absorber 518 may comprise carbon black or a dark pigment. In some implementations, the optical absorber 518 and the back reflectors 508 may be incorporated into a single structure. For example, a black plastic sheet acting as the optical absorber 518 may be coated with sputtered aluminum in particular spots to form the back reflectors 508.

As shown here, reflected light 206 is initially directed incident within the acceptance cone, entering the optically transparent material 516, and then reflected back from the back reflector 508. In contrast, the rejected light 208, which is received at an angle outside the acceptance cone enters the optically transparent material 516 and is directed into the optical absorber 518.

Figure 6:
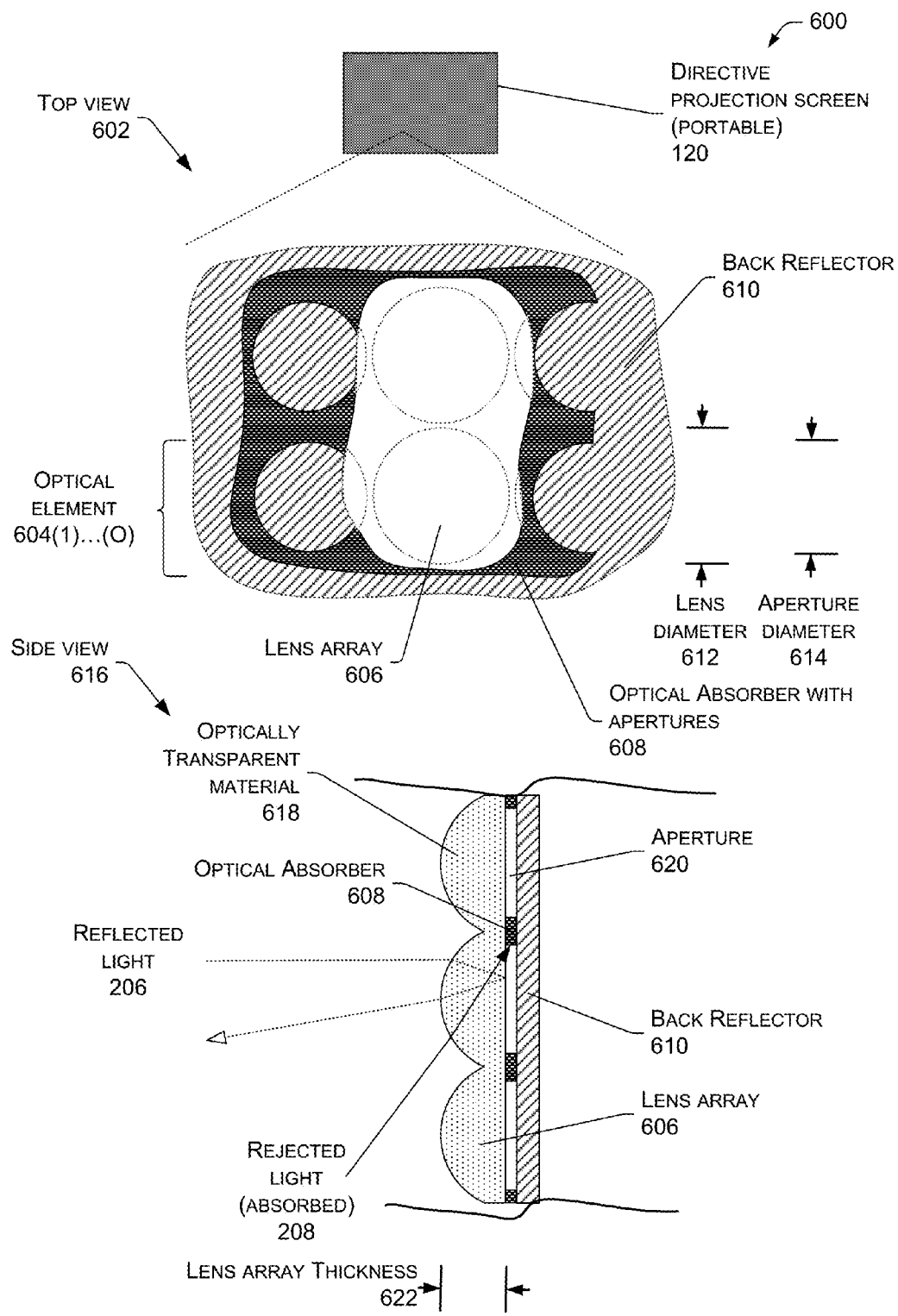
FIG. 6 illustrates an enlarged portion of a directive projection screen comprising a convex lens array with an optical absorber having apertures and back reflectors.

FIG. 6 illustrates an enlarged portion 600 of a directive projection screen 120 (or 108), which includes a plano-convex lens array with an optical absorber having apertures and a back mirror. As shown here in a top view 602, the screen 120 has a plurality of optical elements 604(1), 604(2), ..., 604(O). These optical elements 604(1)-(O) comprise a lens array 606, an optical absorber 608, and a back reflector 610. Lenses in the lens array 606 may be spherical or aspherical and plano-convex in profile, having a convex side and a planar side. The optical absorber 608 is formed of a material to substantially absorb incident visible light frequencies, as described above. The back reflector 610 is configured to substantially reflect incident visible light frequencies. For example, the back reflector 610 may comprise aluminum. In some implementations, the optical absorber 608 and the back reflector 610 may be combined. For example, the optical absorber 608 may be printed on the back reflector 610.

As shown here, a lens diameter 612 is shown, along with a corresponding aperture diameter 614 which is less than the lens diameter 612. In other implementations, the diameters may be about the same.

A side view 616 shows the lens array 606 comprising an optically transparent material 618 such as glass, plastic, and so forth. Behind the lens array 606 is the optical absorber 608, which is formed with multiple apertures 620. The apertures 620 may be substantially aligned with the lenses, or offset to alter the acceptance cone, viewing cone, or both. As shown here, the reflected light 206 enters within the acceptance cone and is reflected by the back reflector 610. In contrast, the rejected light 208 is diverted into the optical absorber 608.

The lens array 606 has a thickness 622, which may vary based on the material employed. When the optically transparent material 618 of the lens array 606 comprises plastic, the thickness 622 of the lens array 606 may be about 1.5 times a radius of curvature of the plano-convex lenses. In another implementation, the thickness 622 of the lens array may be equal to or less than one-half of a lens focal length.

Example Implementations of Passive Projection Screen for 3D

Figure 7:
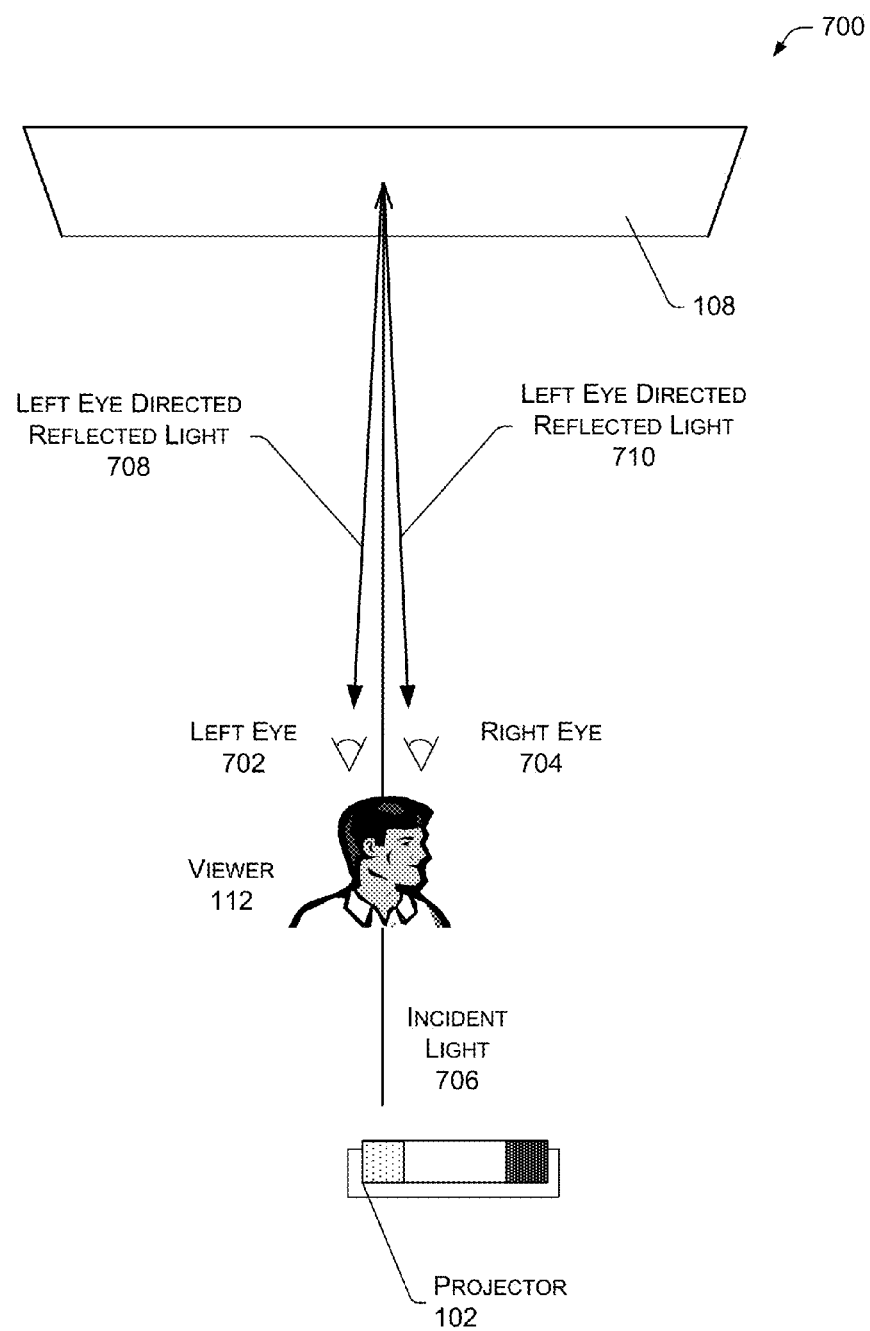
FIG. 7 illustrates an alternative arrangement of elements in the passive directive projection screen to enable a 3D experience for a user.

FIG. 7 illustrates another configuration 700 of the directive projection screen in which the screen returns projected images to the viewer 112 in a way that appears three dimensional (3D) to the viewer. In this illustration, the mounted directive projection screen 108 is shown, although the portable screen 120 may be similarly configured. A projector 102 projects light onto the passive screen 102, where it is scattered and reflected back as an image to the viewer 112.

Generally, the projection screen 108 has an array of optical elements that allows the viewer 112 to see one portion of the projected image with his left eye 702 and another portion of the projected image with his right eye 704. More particularly, the incident light 706 projected from the projector 102 onto the screen 108 is received by the optical elements of the screen 108. The image has pixel sizes that are smaller than the size of the individual optical elements. The optical elements reflect part of the image in a direction 708 toward the viewer's left eye 702 and part of the image in another direction 710 toward the viewer's right eye 704. The angular difference of the reflected light forms a parallax effect for the human viewer. In this manner, the viewer perceives the reflected image as 3D, thereby facilitating a 3D experience without the viewer needing to where special 3D glasses.

There are several ways to implement this 3D effect using a passive screen. Three different techniques are described below with reference to the implementations of FIGS. 8-10. In these implementations, the optical elements share a common characteristic in that, pixel by pixel, a surface feature of the screen enables the viewer's left eye to see one image and the viewer's right eye to see a different image.

Figure 8:
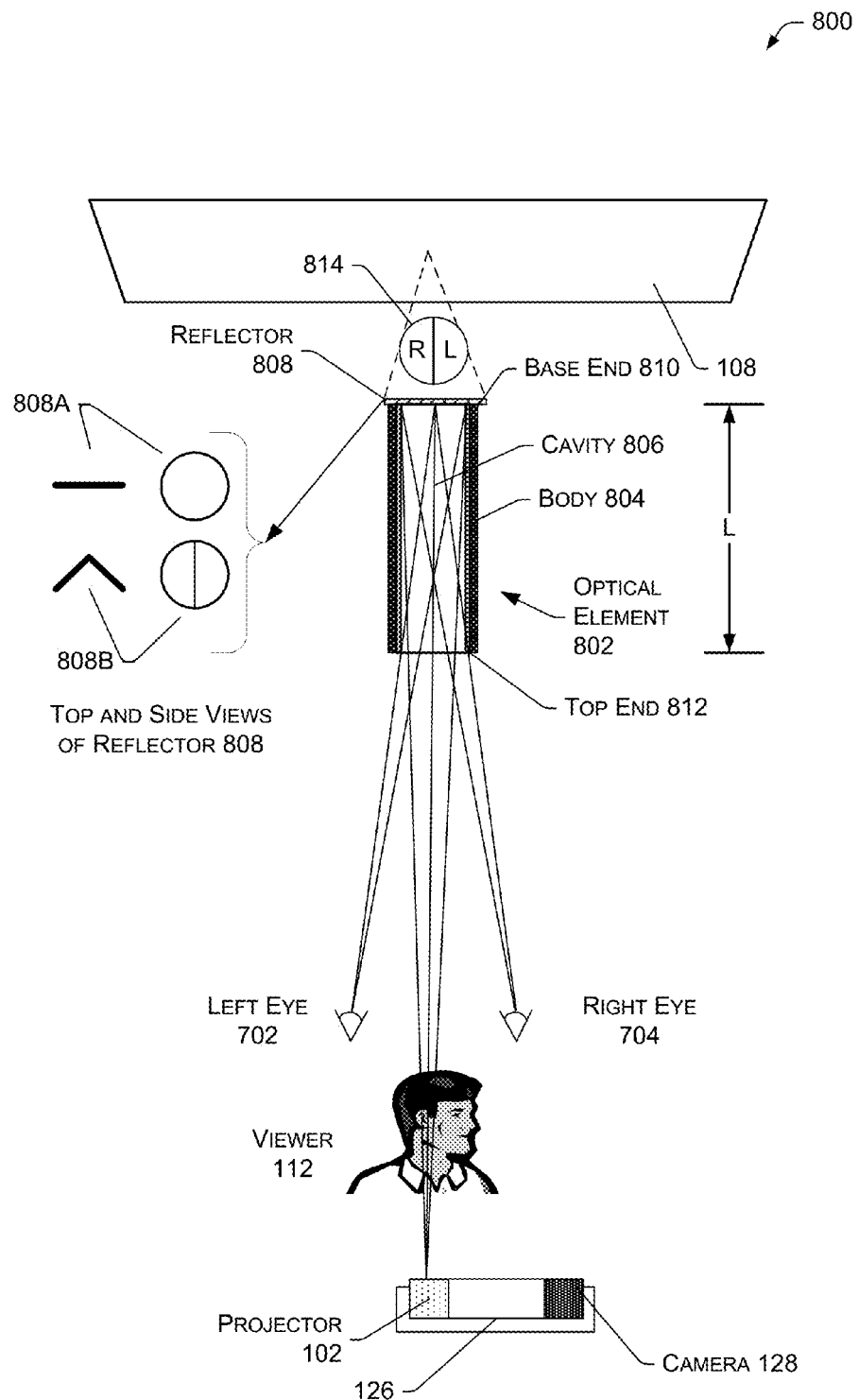
FIG. 8 illustrates an enlarged portion of a directive projection screen having elements comprised of wells and reflectors that direct different parts of the image toward the left eye or right eye of the human viewer.

FIG. 8 shows a first implementation 800 of a passive display screen for presenting projected images in 3D. In this view, the directive projection screen 108 (or 120) has an array of optical elements formed on one surface used to present an image projected by projector 102. A magnified view of one optical element 802 is shown expanded from the screen 108. The optical element 802 is formed as an elongated body 804 that defines a hollow well or cavity 806 therein. The body 804 may be formed as a cylindrical tube having a circular cross-section. As one example implementation, the cylindrical tube has a diameter equal to or less than about 100 microns. Alternatively, the body 804 may be formed as other structure members with other cross-sectional shapes, such as oval or polygonal.

The body 804 may be formed of any suitable material, such as plastic. The internal surface of the body 804 may also be reflective to convey the light rays down through the cavity 806 to the base of the body 804.

At the base of the body 804 is a reflector 808 that reflects light received through the cavity 806 from the projector 102. The reflector 808 may be formed of any type of reflection material, such as those mentioned above in earlier implementations. The reflector 808 may have a perimeter shaped to correspond with the shape of the interior surface of the body 804. Hence, if the body 804 is a cylinder with a circular cross-section, the reflector 808 may also have a circular perimeter as illustrated in FIG. 8. However, the reflector's perimeter may be formed in shapes other than circular. Additionally, the reflector 808 may also be formed with a reflection surface that is flat, concave, or convex. A flat surface is shown as reflector implementation 808A in FIG. 8. Additionally, the reflector 808 may have a continuous reflection surface, such as reflector 808A, or exhibit a discontinuity, such as two flat regions being joined at an angel, as shown in reflector implementation 808B.

The body 804 of optical element 802 has a length L from a first, inner, or base end 810 adjacent the reflector 808 to a second, outer, or top end 812 that is distal to the reflector. The length L of the body 804, the position of the projector 102, and the focus of the image projector thereon are coordinated to provide a parallax effect for the human viewer. This parallax effect allows the human's left eye 702 to see part of the image being reflected from the reflector 808 and the human's right eye 704 to see another part of the reflected image. This is illustrated in FIG. 8.

Suppose, for example, the projected image containing multiple pixels is directed into the well 806 formed by the body 804. The image is reflected by the reflector 808. Due to the elongated shape of the body, the well 806 is sufficiently deep that the viewer's right eye 704 sees only a portion of the image, such as the left half side of the reflector. This is represented by the "R" in the left half side of the circular reflector representation 814. Similarly, the viewer's left eye 702 sees only a portion of the image, such as the right half side of the reflector, as represented by the "L" in the right half side of the circular reflector representation 814.

The projector 102 may project dual portions of the image onto the screen 108, in which a first image is projected into and reflected from the left half of the well 806 and reflector 808, and a different second image is projected into and reflected from the right half of the well 806 and reflector 808. In this manner, the right eye sees a different image than the left eye, enabling a 3D experience.

When the projector 102 and the screen 108 are both fixed, the challenge of projecting two different images onto the different portions of the optical elements 802 can be controlled. However, for a mobile surface, such as the portable screen 120, the problem of projecting the dual image onto the surface is more difficult. In this situation, the projector employs a tracking mechanism that observes the images being projected onto the surface and attempts to track movement of the screen, and adjust the projection direction accordingly. As one implementation, the projector 102 may be part of a node 126 having a camera 128 for capturing the images projected onto the surface of a screen (such as screen 120). As the screen is moved, the camera 128 senses the movement and observes the reflected images. This information is fed back to a computing unit at the node 126 (or remote therefrom) that computes a new projection angle and focus, and provides these new parameters to the projector 102.

In this manner, the projection system is able to track the image on the screen to determine which pixels of the projected image appear in one portion of the wells 806 of the elements 802 and would be visible by the left eye 702 and which pixels appear in another portion of the wells 806 of the elements 802 and would be visible by the right eye 704. This map of left and right eye pixels may be maintained by the computing unit to display the left and right image components for the viewer to see a 3D image.

Figure 9:
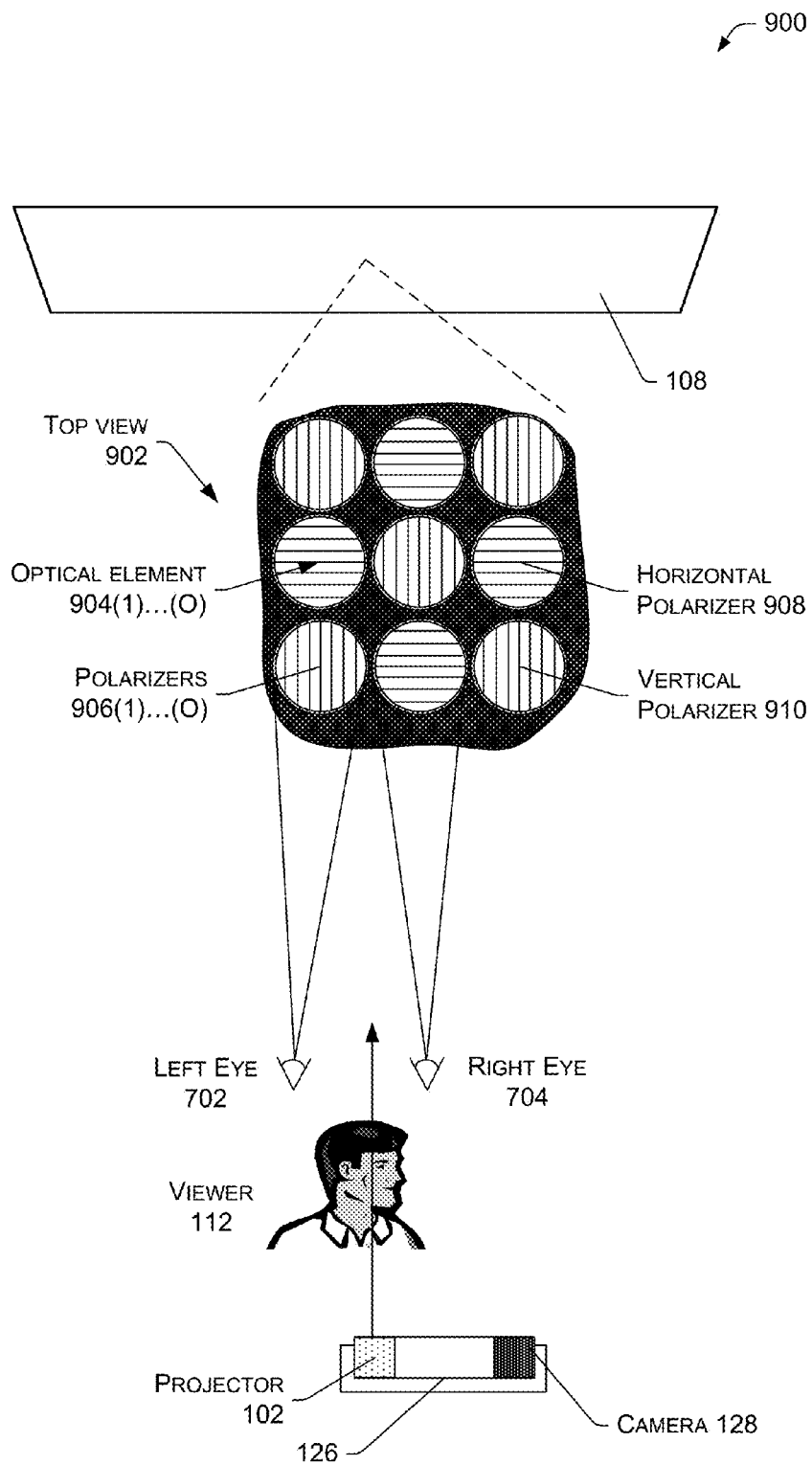
FIG. 9 illustrates an enlarged portion of a directive projection screen in which two different polarized filters are overlaid on the wells or cavities to selectively allow a viewer to see first optical elements with one polarity with a left eye and second optical elements with another polarity with a right eye.

FIG. 9 shows a second implementation 900 of a passive display screen for presenting projected images in 3D. In this view, the directive projection screen 108 (or 120) has an array of optical elements formed on one surface used to present an image projected by projector 102. For discussion purposes, the optical elements may be configured as element 802 shown in FIG. 8. One of the challenges noted above, is attempting to track the left and right side images, particularly when the projection screen is being moved. In implementation 900, the tracking function is significantly reduced or even eliminated through use of polarization lenses placed at the opening of the bodies 804.

A top and magnified view 902 of the screen 108 is illustrated to show a plurality of optical elements 904(1), 904(2), . . . , 904(O). The optical elements 904(1)-(O) may be arranged in a number of ways. In this illustration, the elements are arranged in a matrix of linear rows and columns. Each optical element 904 has a body 804 (see FIG. 8) overlaid with an associated polarizer 906. A polarizer is an optical filter that passes light of a specific polarization. It may also block light of other polarizations. Two common types of polarizers are linear polarizers and circular polarizers.

As illustrated, the polarizers 906(1)-(O) have two polarization patterns: horizontal and vertical. As one example, alternating optical elements are fitted with horizontal polarizers 908, and the remaining optical elements are fitted with vertical polarizers 910. This forms a checkerboard pattern of alternating polarizers overlaid on the wells in the optical elements. Other patterns may be used, such as alternating rows or alternating columns, for small contiguous groups of elements having differing polarizations, and so forth.

The projector 102 generates a corresponding polarized light for transmission to the screen and polarizers 906(1)-(O). For instance, the projector 102 may employ a color wheel with one set of segments polarized a first direction and a second set of segments polarized a second direction. In this manner, the light projected through the first set of segments is received and passed by the horizontal polarizers 908 and the light projected through the second set of segments is received and passed by the vertical polarizers 910. One advantage of using a color wheel with two sets of segments is that the projected image may exhibit increased brightness when used on a surface or screen that does not have the polarizers 906.

With this arrangement, the projector 102 generates a left eye image using one polarization and a right eye image using a second polarization. As illustrated, the left eye 702 may perceive the image passed by the vertical polarizers 910 while the right eye 704 may perceive the image passed by the horizontal polarizers 908.

Figure 10:
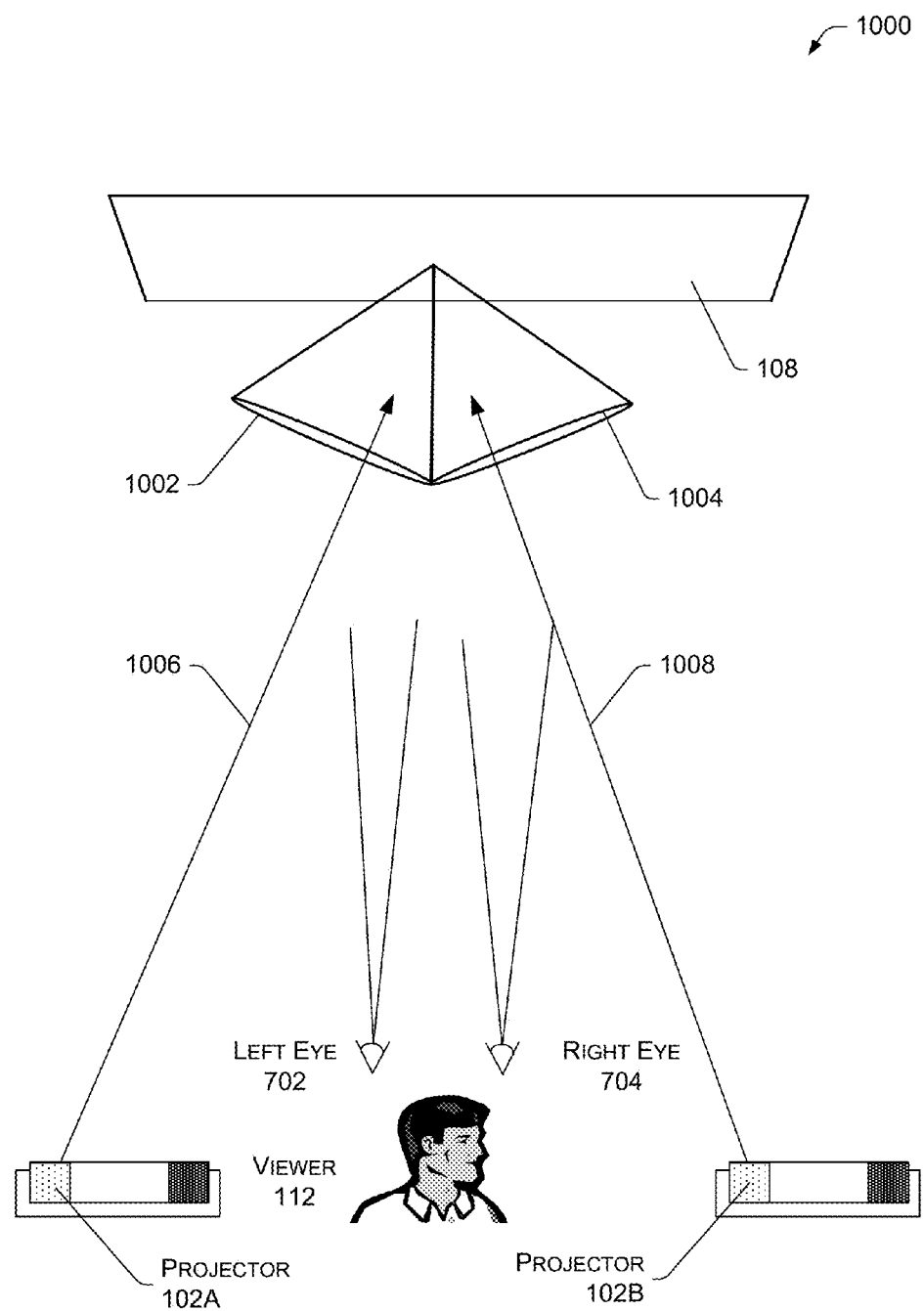
FIG. 10 illustrates a directive projection screen that provides a 3D effect in an image projected thereon by two projectors.

FIG. 10 shows a third implementation 1000 of a passive display screen for presenting projected images in 3D. In this implementation, two projectors 102A and 102B are used to project an image onto the directive projection screen 108 (or 120). The screen 108 has an array of optical elements that are configured in a way to present acceptance cones of incident light. Accordingly, the optical elements may be configured as shown and described, for example, as the elements 304 in FIG. 3, elements 404 in FIG. 4, elements 504 in FIG. 5, and elements 604 in FIG. 6.

However, unlike the optical element patterns shown in these earlier configurations, the elements are arranged to present different angled acceptance cones, as represented by a first acceptance cone 1002 and a second acceptance cone 1004. The cones are oriented to accept light from one projector while rejecting light from the other. More particularly, the first acceptance cone 1002 accepts the projected light 1006 from the projector 102A, while rejecting the light 1008 from the projector 102B. Similarly, the second acceptance cone 1004 accepts the projected light 1008 from the projector 102B, while rejecting the light 1006 from the projector 102A. The angled acceptance cones, relative to the surface plane of screen 108, may be accomplished by angling the optical elements relative to the screen substrate. Thus, first elements may be arranged or angled relative to the screen substrate to provide the first acceptance cone 1002 and second elements may be arranged or angled relative to the screen substrate to provide the second acceptance cone 1004. The optical elements may be angled in an alternating, checkerboard pattern, or arranged such that every other row or column has the same angle, or in any other suitable groupings.

The two projectors 102A and 102B project different images to provide a left image and a right image. The left image is accepted by all of the left leaning acceptance cones 1002 and the right image is accepted by all of the right leaning acceptance cones 1004. The human viewer 112 sees, in left eye 702, the left image accepted by the first acceptance cone 1002 and reflected back to the viewer. The human viewer 112 also sees, in right eye 704, the right image accepted by the second acceptance cone 1004 and reflected back to the viewer.

Polarizers may optionally be added to the optical elements as described above.

Figure 11:
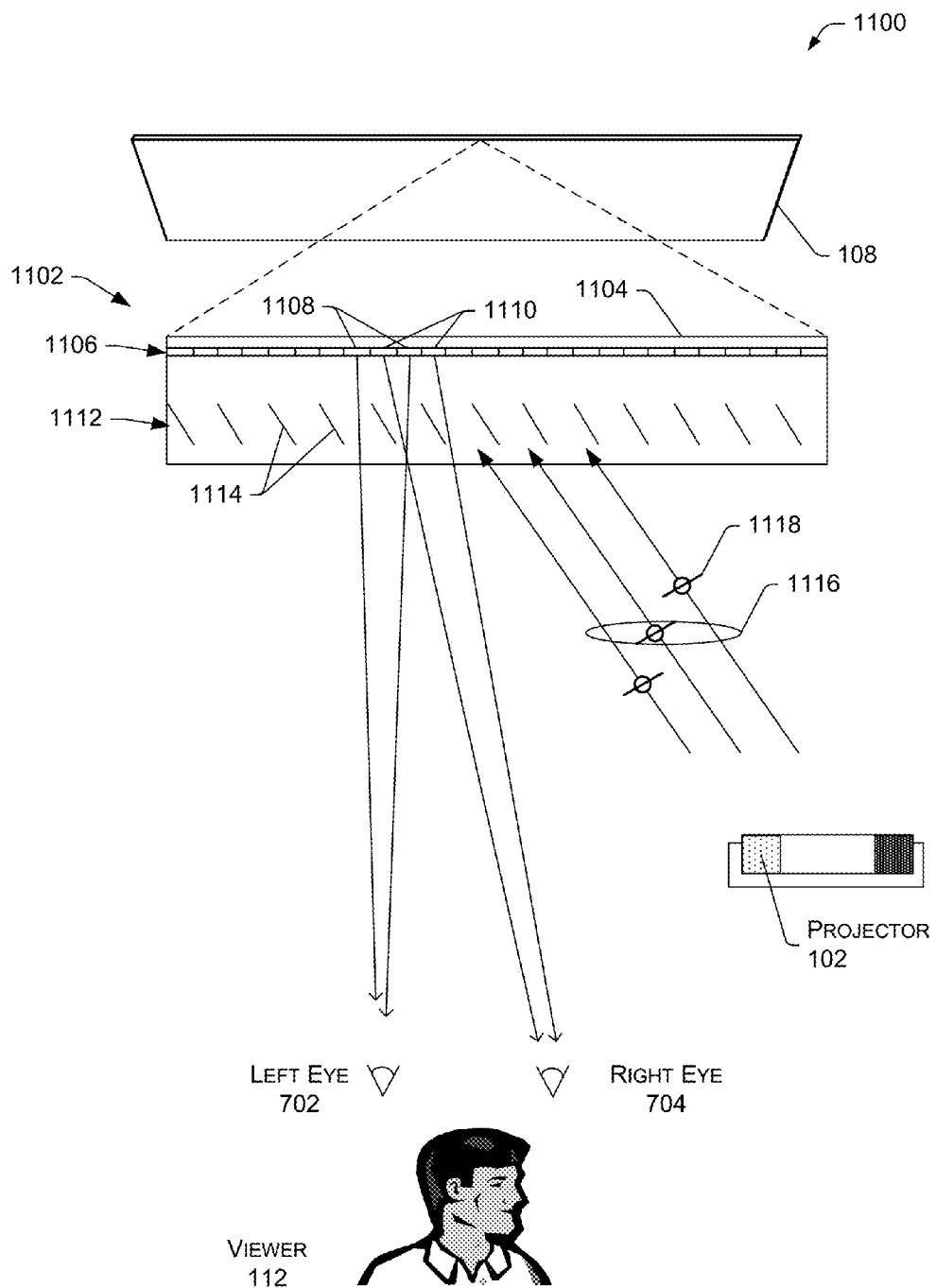
FIG. 11 illustrates a directive projection screen that utilizes a parallax barrier and alternating polarization patterns to create a 3D effect in an image projected thereon.

FIG. 11 shows a fourth implementation 1100 of a passive display screen for presenting projected images in 3D. In this implementation, a projector 102 projects an image onto the directive projection screen 108 (or 120) from an angle, such as from the side or from overhead. A viewer 112 is shown watching the screen 108 from a position approximately normal to the screen surface. A left eye 702 and a right eye 704 of the viewer 112 are represented.

The screen 108 is formed of several passive layers or elements. A top edge view 1102 of the screen is enlarged to show these layers. The screen 108 includes a back layer 1104 formed of a material to scatter light projected thereon by the projector 102. The back layer 1104 may be rigid or flexible. The surface may be white or other color, with a contour sufficient to scatter light.

Figure 12:
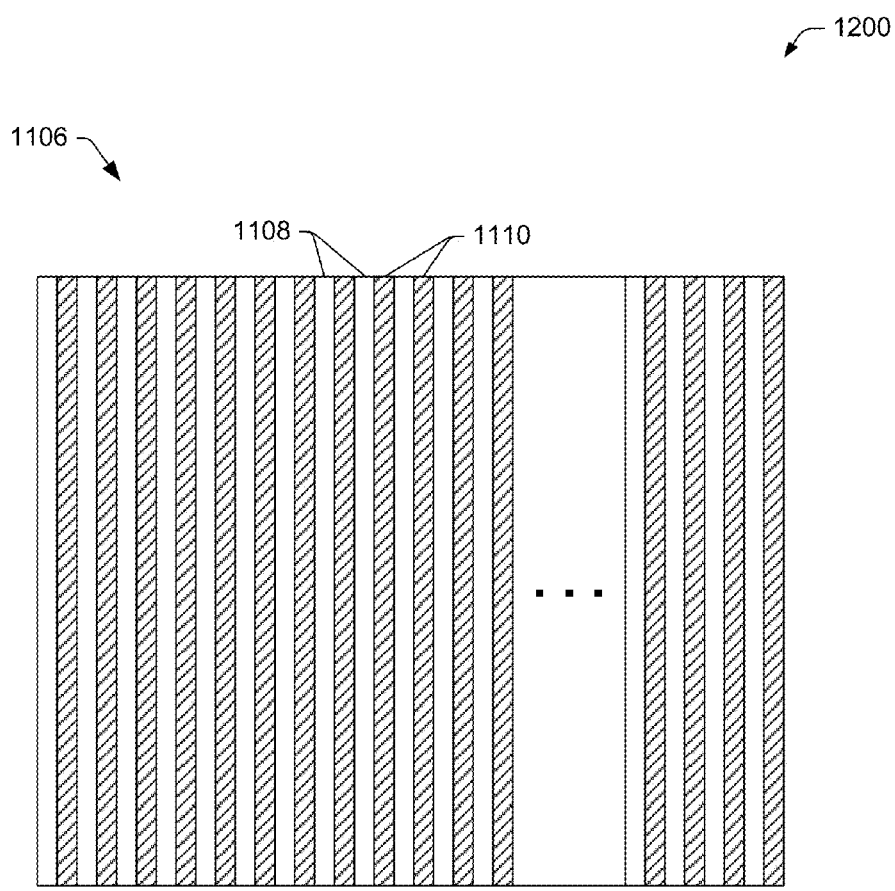
FIG. 12 shows one example alternating polarization pattern used in the screen of FIG. 11.

A polarization layer 1106 overlays the back layer 1104. The polarization layer 1106 is composed of a pattern of areas, where each area has at least one type of polarization. In one implementation, the polarization areas is an array of alternating polarizer strips, including first polarizer strips 1108 having a first polarization and second polarizer strips 1110 having a second polarization. The first polarizer strips 1108 pass light having first image components of the first polarization and the second polarizer strips 1110 pass light having second image components of the second polarization. The light is passed through the polarization layer 1106 to the back layer 1104, where the light is scattered and depolarized FIG. 12 shows one example pattern 1200 of the first and second polarizers of the polarization layer 1106. In this implementation, the first and second polarizers are interleaved to provide an alternating pattern of first and second polarizations. As one example, the first polarizer strips 1108 are formed with a clockwise polarization, while the second polarizer strips 1110 are formed with a counterclockwise polarization. In another example, the first polarizer strips 1108 are formed with vertical polarization, while the second polarizer strips 1110 are formed with horizontal polarization. Each of the polarizer strips 1108 and 1110 has a small width, with an example width being approximately one pixel (e.g., 50 to 300 microns).

With reference again to FIG. 11, the screen 108 further includes a parallax barrier layer 1112 with a parallax barrier oriented along an angle of the expected projection. As shown, the parallax barrier is formed of spaced opaque slats or regions 1114. The opaque regions 1114 may be angled or otherwise have a dimensional aspect that allows the parallax barrier to receive the light from the projector 102 without any substantial blocking. Light 1116 emitted from the projector 102 passes through gaps between the opaque regions 1114, allowing most all of the light to reach the polarizing filters. Also, in the illustrated implementation, the opaque regions 1114 may be arranged adjacent to one type of polarization strips (e.g., second polarizer strips 1110), while the gaps are adjacent to the other type of polarization strips (e.g., first polarizer strips 1108).

A transparent layer 1118 is also provided to hold the parallax barrier layer 1112 in a spaced distance from the polarization layer 1106. The transparent layer 1118 also provides a protective surface of the screen, while passing light therethrough. The transparent layer 1118 may be formed of any type of light transmissive material, such as plastic, acrylic, or COC.

In operation, light 1116 is projected from the projector 102 with two types of polarization. Each polarization has one of the views or images that make up a 3D binocular view. The opposite polarization types are combined into a single beam of light and emitted from the projector. The combined polarization types (e.g., vertical and horizontal) are represented pictorially by a symbol 1118 formed of a circle with a line therethrough. The light 1116 approaches the screen 108 at an angle, such as over the viewer's shoulder or off to one side. The light 1116 passes through the transparent layer 1118, through the opaque regions 1114 of the parallax barrier layer 1112, and onto the polarization layer 1106. The polarization strips 1108 and 1110 only permit light of one particular type of polarization while rejecting or quenching the other. For instance, the first polarization strips 1108 may pass light of a first polarization (e.g., vertical or clockwise) while rejecting light of a second polarization (e.g., horizontal or counterclockwise). Concurrently, the second polarizing strips 1110 would pass light of the second polarization (e.g., horizontal or counterclockwise) while rejecting light of the first polarization (e.g., vertical or clockwise). The light that is passed by the polarization layer 1106 hits the surface of the back layer 1104 and is scattered. The light is also depolarized. The left and right images are interleaved, so that pixel-wide strips of the left image alternate with pixel-wide strips of the right image.

The light is scattered back toward the human viewer 112. The parallax barrier layer 1112 blocks and passes light to respective left eye 702 and right eye 704 along first and second lines of sight. For instance, light passed by the first polarizer strips 1108 may be visible through the parallax barrier to the left eye 702 along a first line of sight, while blocking the path to the right eye 704. Similarly, light passed by second polarizer strips 1110 may be visible through the parallax barrier to the right eye 704 along a second line of sight, while blocking the path to the left eye 702. This helps create a three-dimension visual effect.

Figure 13:
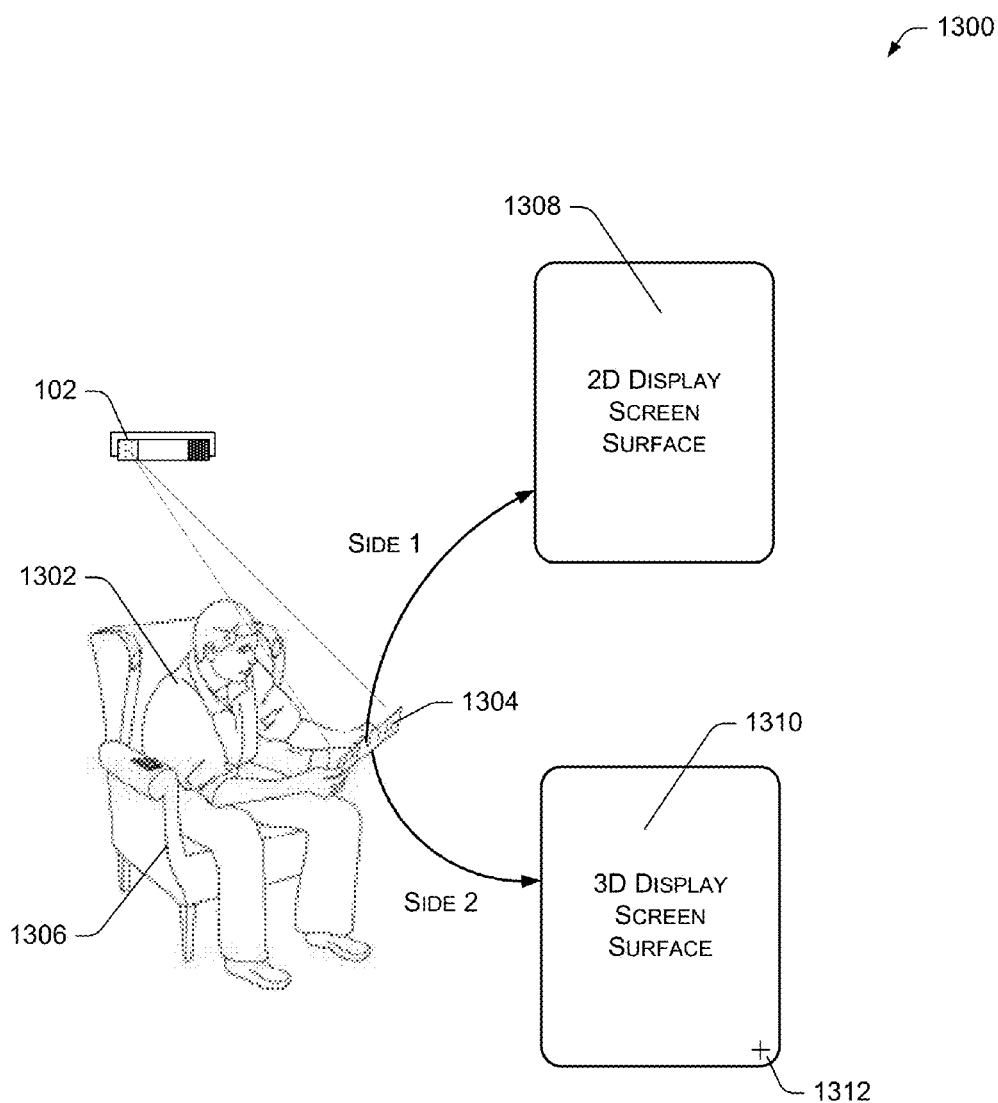
FIG. 13 illustrates a portable passive projection screen having a first side with a surface that facilitates viewing of projected images in 2D and a second side with a surface that facilitates viewing of projected images in 3D.

FIG. 13 illustrates a user scenario 1300 in which a viewer 1302 is holding a two-sided portable passive projection screen 1304. The viewer is shown sitting in a chair 1306, although the user may also be mobile, such as walking around a room or down a hall. The viewer 1302 is looking at the first side or surface 1308 of the screen 1304. The first side 1308 facilitates viewing of images projected by the projector 102 in two dimensions. The first side 1308 may be formed using a traditional reflective surface or alternatively, as a directive projection screen such as any one of the implementations described above with respect to FIGS. 3-6.

The viewer 1302 may alternatively flip the screen 1304 so that a second side or surface 1310 is exposed to the projector 102. The second side 1310 facilitates viewing of images projected by the projector 102 in 3D. The second side 1310 may be formed according to any one of the implementations described above with respect to FIGS. 8-12. Upon detecting the second side 1310 of the screen 1304, the projector 102 begins projecting the right and left images to yield a 3D effect when presented on the screen. The camera 128 or other sensor on node 126 may be used to distinguish between the first and second sides of the screen 1304. In one implementation, for example, the second surface 1310 may have a registration mark 1312 depicted thereon to ensure easy detection by the node 126.

Accordingly, the portable projection screen 1304 may be used to view images either in 2D or 3D, simply by flipping the screen to expose a different surface of passive optical elements. The different surfaces may allow for viewing conditions that are suitable for different types of content. For instance, text content like books may be projected onto the 2D surface 1308, whereas videos may be projected onto the 3D surface 1310.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device, comprising:
   a back layer configured to receive light from a projector on a front side of the device and to scatter the light back from the front side of the device, the light received from the projector having first image components of a first polarization and second image components of a second polarization;
   a polarization layer adjacent the back layer, the polarization layer having at least first and second polarization areas, the first polarization areas substantially passing the light having the first image components of the first polarization and the second polarization areas substantially passing the light having the second image components of the second polarization; and
   a parallax barrier layer adjacent to, but spaced from, the polarization layer, the parallax barrier layer forming a parallax barrier so that the first image components returned by the back layer are viewable through the parallax barrier along a first direction and the second image components returned by the back layer are viewable through the parallax barrier along a second direction.

2. The device of claim 1, wherein the first polarization is vertical and the second polarization is horizontal.

3. The device of claim 1, wherein the first polarization is clockwise and the second polarization is counterclockwise.

4. The device of claim 1, wherein the first and second polarization areas are formed as elongated strips.

5. The device of claim 1, wherein the first and second polarization areas are formed as elongated strips, such that first strips of the first polarization are interleaved with second strips of the second polarization.

6. The device of claim 5, wherein the parallax barrier layer has opaque regions spaced apart from one another to form gaps between adjacent opaque regions, the opaque regions being arranged to overlay one of the first strips or the second strips, while the gaps overlay the other of the first strips or the second strips.

7. The device of claim 6, wherein the opaque regions are angled to pass the light from the projector when projected at an angle to the projection screen.

8. The device of claim 1, wherein the parallax barrier layer has opaque regions.

9. A projection system comprising:
    a passive display screen comprising:
        a back layer configured to receive light from a projector on a front side of the device and to scatter the light back from the front side of the device, the light received from the projector having first image components of a first polarization and second image components of a second polarization;
        a polarization layer adjacent the back layer, the polarization layer having at least first and second polarization areas, the first polarization areas substantially passing the light having the first image components of the first polarization and the second polarization areas substantially passing the light having the second image components of the second polarization; and
        a parallax barrier layer adjacent to, but spaced from, the polarization layer, the parallax barrier layer forming a parallax barrier so that the first image components returned by the back layer are viewable through the parallax barrier along a first direction and the second image components returned by the back layer are viewable through the parallax barrier along a second direction; and
    a projector to project the light onto the passive display screen.

10. The projection system of claim 9, wherein the first and second polarization areas are formed as elongated strips, such that first strips of the first polarization are interleaved with second strips of the second polarization.

11. The projection system of claim 10, wherein the parallax barrier layer has opaque regions spaced apart from one another to form gaps between adjacent opaque regions, the opaque regions being arranged to overlay one of the first strips or the second strips, while the gaps overlay the other of the first strips or the second strips.

12. The projection system of claim 11, wherein the opaque regions are angled to pass the light from the projector when projected at an angle to the projection screen.

13. The projection system of claim 9, wherein the first polarization is vertical and the second polarization is horizontal.

14. The projection system of claim 9, wherein the first polarization is clockwise and the second polarization is counterclockwise.

15. A device, comprising:
    a back layer configured to receive light from a projector on a front side of the device and to scatter the light back from the front side of the device, the light being received having first image components of a first polarization and second image components of a second polarization;
    a polarization layer adjacent the back layer, the polarization layer having first polarization strips interleaved with second polarization strips to pass respectively, to the back layer, the first image components of the first polarization and the second image components of the second polarization; and
    a parallax barrier layer adjacent to, but spaced from, the polarization layer, the parallax barrier layer having a plurality of opaque regions spaced apart from one another to form gaps between adjacent opaque regions, the opaque regions being arranged to overlay one of the first polarization strips or the second polarization strips while the gaps are arranged to overlay the other of the first polarization strips or the second polarization strips.

16. The device of claim 15, wherein the first polarization is vertical and the second polarization is horizontal.

17. The device of claim 15, wherein the first polarization is clockwise and the second polarization is counterclockwise.

18. The device of claim 15, wherein the first and second polarization strips are formed as elongated strips.

19. The device of claim 15, wherein the opaque regions are angled to pass the light from the projector when projected at an angle to the device.

20. The device of claim 15, further comprising a substrate, wherein the back layer, the polarization layer, and the parallax barrier layer are arranged on a first side of the substrate, and a second surface is provided on an opposing second side of the substrate to present an image in two dimensions.

* * * * *